US011622058B2

(12) United States Patent
Okuma (10) Patent No.: US 11,622,058 B2
(45) Date of Patent: Apr. 4, 2023

(54) ELECTRONIC APPARATUS AND CONTROL METHOD OF ELECTRONIC APPARATUS

(71) Applicant: CANON KABUSHIKI KAISHA, Tokyo (JP)

(72) Inventor: Yasuhiko Okuma, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/843,776

(22) Filed: Apr. 8, 2020

(65) Prior Publication Data

US 2020/0329167 A1 Oct. 15, 2020

(30) Foreign Application Priority Data

Apr. 15, 2019 (JP) .............................. JP2019-077389

(51) Int. Cl.
*G06F 15/00* (2006.01)
*H04N 1/00* (2006.01)
(52) U.S. Cl.
CPC ..... *H04N 1/00896* (2013.01); *H04N 1/00395* (2013.01)
(58) Field of Classification Search
CPC ...................... H04N 1/00896; H04N 1/00395
USPC ...................................................... 358/1.13
See application file for complete search history.

(56) References Cited

U.S. PATENT DOCUMENTS

| 2008/0086659 A1* | 4/2008 | Ishikawa | ............. | G06F 11/1441 |
| | | | | 714/22 |
| 2014/0029043 A1* | 1/2014 | Nagami | ............. | H04N 1/00899 |
| | | | | 358/1.14 |
| 2015/0003850 A1* | 1/2015 | Umimura | ............... | G03G 15/80 |
| | | | | 399/37 |

FOREIGN PATENT DOCUMENTS

JP 2009-76155 A 4/2009

\* cited by examiner

*Primary Examiner* — Mark R Milia
(74) *Attorney, Agent, or Firm* — Canon U.S.A., Inc. IP Division (57) ABSTRACT

An electronic apparatus includes a power source, a power monitoring unit configured to monitor an output voltage output from the power source, an acceptance unit configured to accept a user operation to turn off the electronic apparatus, and an execution unit configured to operate using power output from the power source, execute shutdown processing in response to the user operation accepted through the acceptance unit, and execute the shutdown processing when the output voltage monitored by the power monitoring unit is lower than a threshold voltage. The threshold voltage is higher than a guaranteed operation voltage of the execution unit.

18 Claims, 7 Drawing Sheets

ELECTRONIC APPARATUS AND CONTROL METHOD OF ELECTRONIC APPARATUS

BACKGROUND

Field

The present disclosure relates to an electronic apparatus that executes shutdown processing and a control method of the electronic apparatus.

Description of the Related Art

In a conventional image processing apparatus, such as a printer, a facsimile machine, or a copy machine, power output from a power source is supplied to each load of the image processing apparatus. The power source outputs a relatively low voltage to be applied to, for example, a central processing unit (CPU) and a memory, and a relatively high voltage to be applied to, for example, a printer unit and a facsimile unit, of the image processing apparatus.

When devices having different operating voltages are supplied with power in this manner, reduction of a voltage output from the power source due to, for example, turning-OFF of a power switch for a short period of time resulting in an instantaneous interruption of the supplied power, can cause the printer unit and the facsimile unit that operate at a relatively high voltage to be inoperable. In such circumstances, only devices that can operate at a relatively low voltage, such as the CPU and the memory, may be operable.

Japanese Patent Application Laid-Open No. 2009-76155 discusses a technique for securely turning off a hard disk to prevent destruction of the hard disk when an instantaneous interruption of power supplied by the power source is detected.

Even if an output voltage from the power source is reduced, the output voltage may be recovered to a normal range in some cases. According to Japanese Patent Application Laid-Open No. 2009-76155, an image forming apparatus cannot be activated, even if the output voltage from the power source is recovered, unless a user operates a power switch.

SUMMARY

Various embodiments of the present disclosure are directed to a technique capable of, even if an output voltage from a power source is reduced, shifting an electronic apparatus to a power-OFF mode after executing shutdown processing of the electronic apparatus, and further, automatically activating the electronic apparatus when the output voltage from the power source is recovered.

According to various embodiments of the present disclosure, an electronic apparatus includes a power source, a power monitoring unit configured to monitor an output voltage from the power source, an acceptance unit configured to accept a user operation to turn off the electronic apparatus, and an execution unit configured to operate using power output from the power source, execute shutdown processing based on the user operation accepted by the acceptance unit, and execute the shutdown processing when the output voltage monitored by the power monitoring unit is lower than a threshold voltage. The threshold voltage is higher than a guaranteed operation voltage of the execution unit.

Further features will become apparent from the following description of example embodiments with reference to the attached drawings.

DESCRIPTION OF THE EMBODIMENTS

Various embodiments to implement the present disclosure will be described with reference to the accompanying drawings. An image forming apparatus having a printing function and a scanner function will be described as one example of an electronic apparatus. The image forming apparatus can shift into a normal power mode, a sleep mode, and a power-OFF mode. The normal power mode corresponds to a state 0 (S0) of Advanced Configuration and Power Interface (ACPI), the sleep mode corresponds to a state 3 (S3) of the ACPI, and the power-OFF mode corresponds to a state 5 (S5) of the ACPI. The image forming apparatus may shift into a hibernation state corresponding to a state 4 (S4) of the ACPI.

<Overall Configuration of Image Forming Apparatus>

Figure 1:
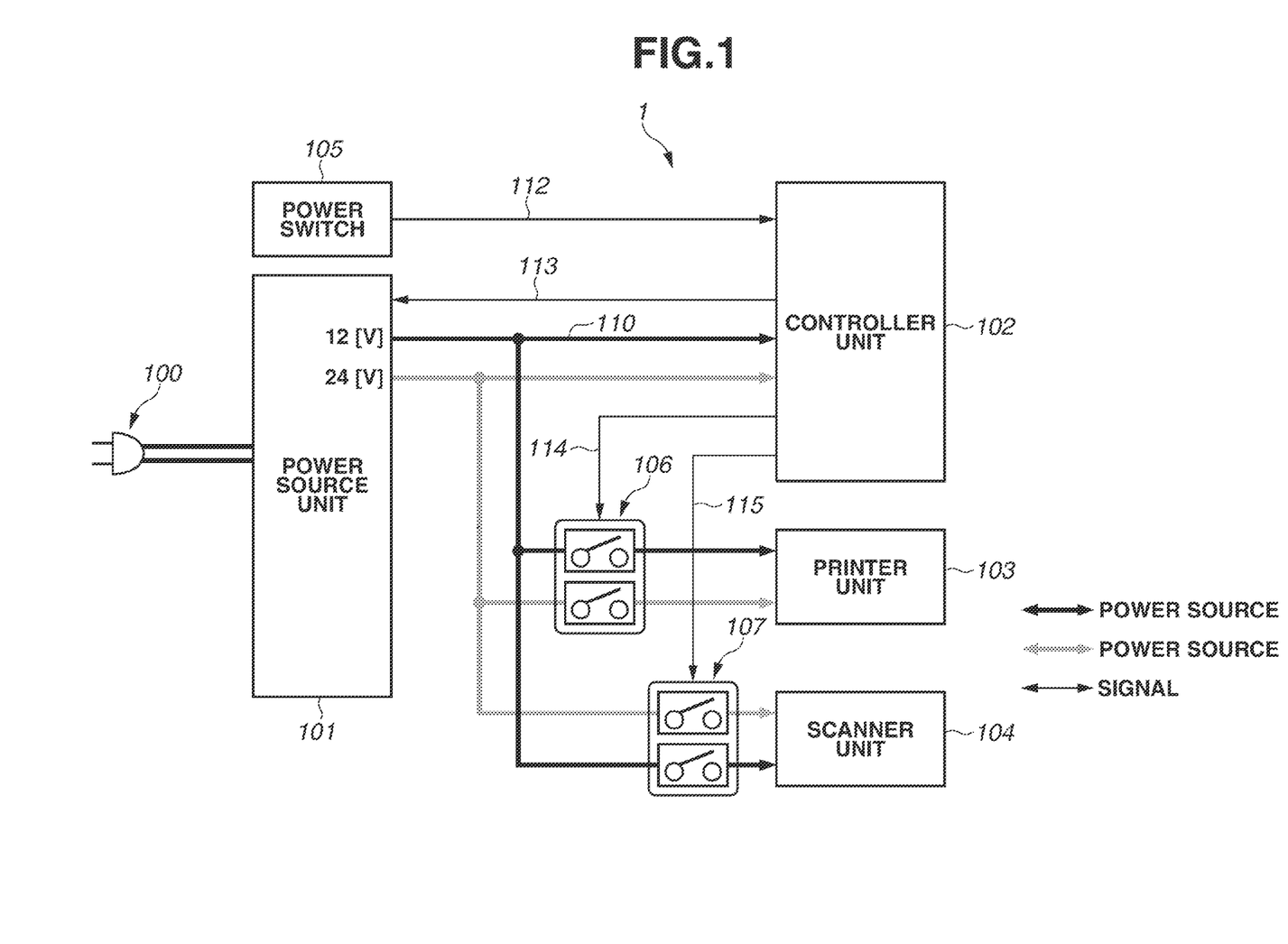
FIG. 1 is a block diagram schematically illustrating an image forming apparatus according to a first embodiment.

FIG. 1 is a block diagram schematically illustrating an image forming apparatus according to a first embodiment. An image forming apparatus 1 includes a power source unit 101, a controller unit 102, a printer unit 103, and a scanner unit 104. Further, the image forming apparatus 1 includes a power switch 105, a switch 106, a switch 107, and an alternating-current (AC) plug 100. The power switch 105 is a mechanical relay switch and is turned ON/OFF by a user operation. The power switch 105 is a main power switch of the image forming apparatus 1. The scanner unit 104 reads an original document image optically and converts the read image into digital image data. The printer unit 103 forms an image on a sheet-like recording medium (paper) according to an electrophotographic method. The printer unit 103 only needs to form an image on the sheet-like recording medium and its recording method is not limited to the electrophotographic method. More specifically, the recording method of the printer unit 103 may be an ink-jet method or a thermal transfer method. The controller unit 102 controls the entire image forming apparatus 1. The controller unit 102 controls the printer unit 103 and the scanner unit 104. The controller unit 102, for example, controls the scanner unit 104 to read the original document image in response to a copy instruction from a user. The controller unit 102 receives digital image data output from the scanner unit 104, executes predetermined image processing, and outputs digital image data that has undergone the image processing to the printer unit 103. Subsequently, the controller unit 102 controls the printer unit 103 to form an image on the recording medium. The power source unit 101 receives AC power from the AC plug 100 plugged in an outlet outside the apparatus and generates direct-current (DC) power. The power source unit 101 supplies predetermined power to the controller unit 102, the printer unit 103, and the scanner unit 104. The power source unit 101 generates a DC voltage of 12 V and a DC voltage of 24 V. The voltages generated by the power source unit 101 are not limited to 12 V and 14 V. The power source unit 101 may generate, for example, a voltage of 5 V and a voltage of 24 V. The power source unit 101 changes an operation status in the power source unit 101 in response to an activation signal 113 output from the controller unit 102. The switch 106 is turned ON/OFF depending on a power source control signal 114 for the printer unit output from the controller unit 102. With this operation, supply of power is stopped to the printer unit 103 or power is supplied to the printer unit 103. The switch 107 is turned ON/OFF depending on a power source control signal 115 for the scanner unit output from the controller unit 102. This operation stops supply of power to the scanner unit 104 or supplies power to the scanner unit 104.

<Configuration of Controller Unit>

Figure 2:
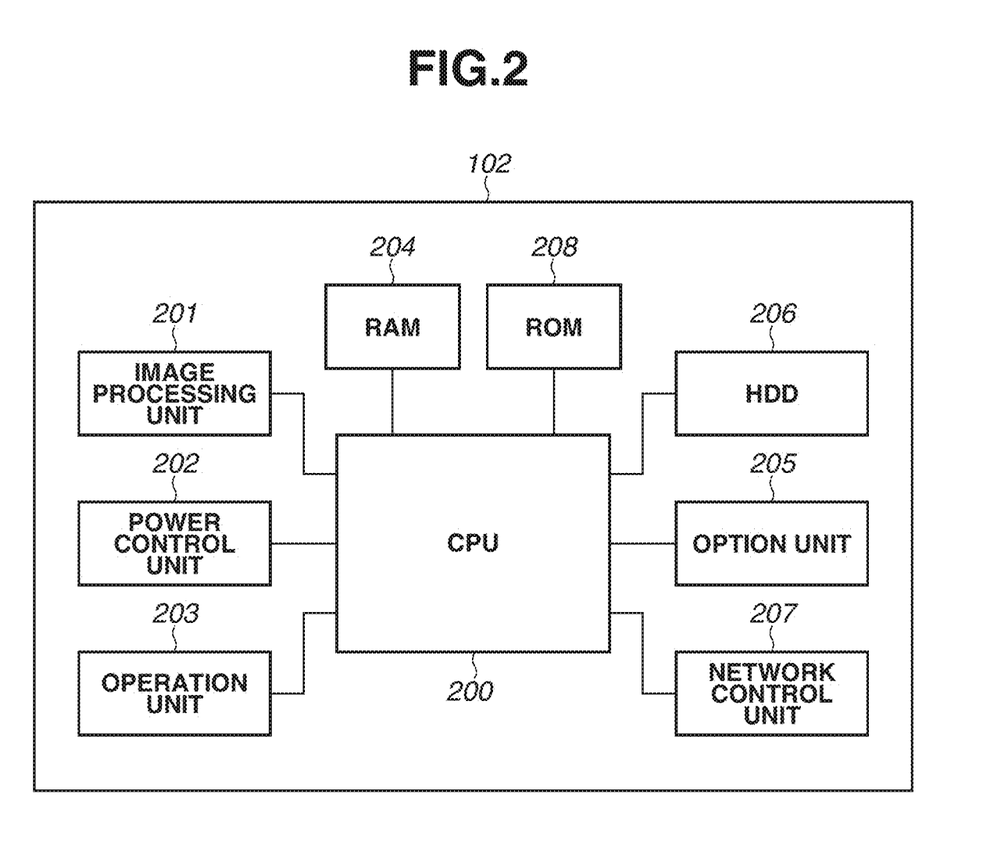
FIG. 2 is a block diagram illustrating details of a controller unit according to the first embodiment.

FIG. 2 is a block diagram illustrating details of the controller unit according to the first embodiment.

The controller unit 102 includes a central processing unit (CPU) 200, an image processing unit 201, a power control unit 202, an operation unit 203, and a random access memory (RAM) 204. The controller unit 102 further includes a read-only memory (ROM) 208, a hard disk drive (HDD) 206, an option unit 205, and a network control unit 207. The CPU 200 is communicably connected to each unit of the controller unit 102. The CPU 200, for example, performs control of peripheral devices of the CPU 200 and circuits, and arithmetic processing of data. For example, the CPU 200 interprets image data (e.g., page description language (PDL) data) received by the network control unit 207 from an external apparatus, and produces bitmap data.

The network control unit 207 communicates with the external apparatus through a local area network (LAN). The network control unit 207 receives the image data (e.g., PDL data) from the external apparatus through the LAN. The network control unit 207 transmits, for example, image data stored in the image forming apparatus 1, setting information set to the image forming apparatus 1, device information of the image forming apparatus 1, consumable item information regarding consumable products used in the image forming apparatus 1.

The image processing unit 201 performs image processing such as screen processing on the bitmap data generated by the CPU 200. With this processing, print data is generated.

The power control unit 202 is composed of, for example, a complex programmable logic device (CPLD). The power control unit 202 controls power supply/stop to each unit of the image forming apparatus 1. While the power control unit 202 according to the first embodiment is composed of the CPLD, the power control unit 202 may be composed of a CPU and a memory to control the power supply/stop to each unit of the image forming apparatus 1 by the CPU executing a program.

The operation unit 203 is provided with an input unit for the user inputting various operations, and a display unit to display various kinds of information. The input unit is a hardware key or a touch sensor.

The CPU 200 loads a program for the controller unit 102 stored in the ROM 208 into the RAM 204 and executes the program. The RAM 204, which is a main memory, stores variables in the program and data transmitted through dynamic memory access (hereinafter referred to as DMA) from each unit. The HDD 206 stores various programs (e.g., operating system) required to operate the image forming apparatus 1, databases, and temporary files. The HDD 206 is exemplified as a storage of the image forming apparatus, but may be a solid state disk (SSD).

The option unit 205 is an interface prepared for function enhancement, and is connected with a wireless communication unit for wireless communication with a facsimile machine that transmits and receives facsimile data and a portable terminal such as a smart phone.

<Description About Power Source Control Configuration Block>

Figure 3:
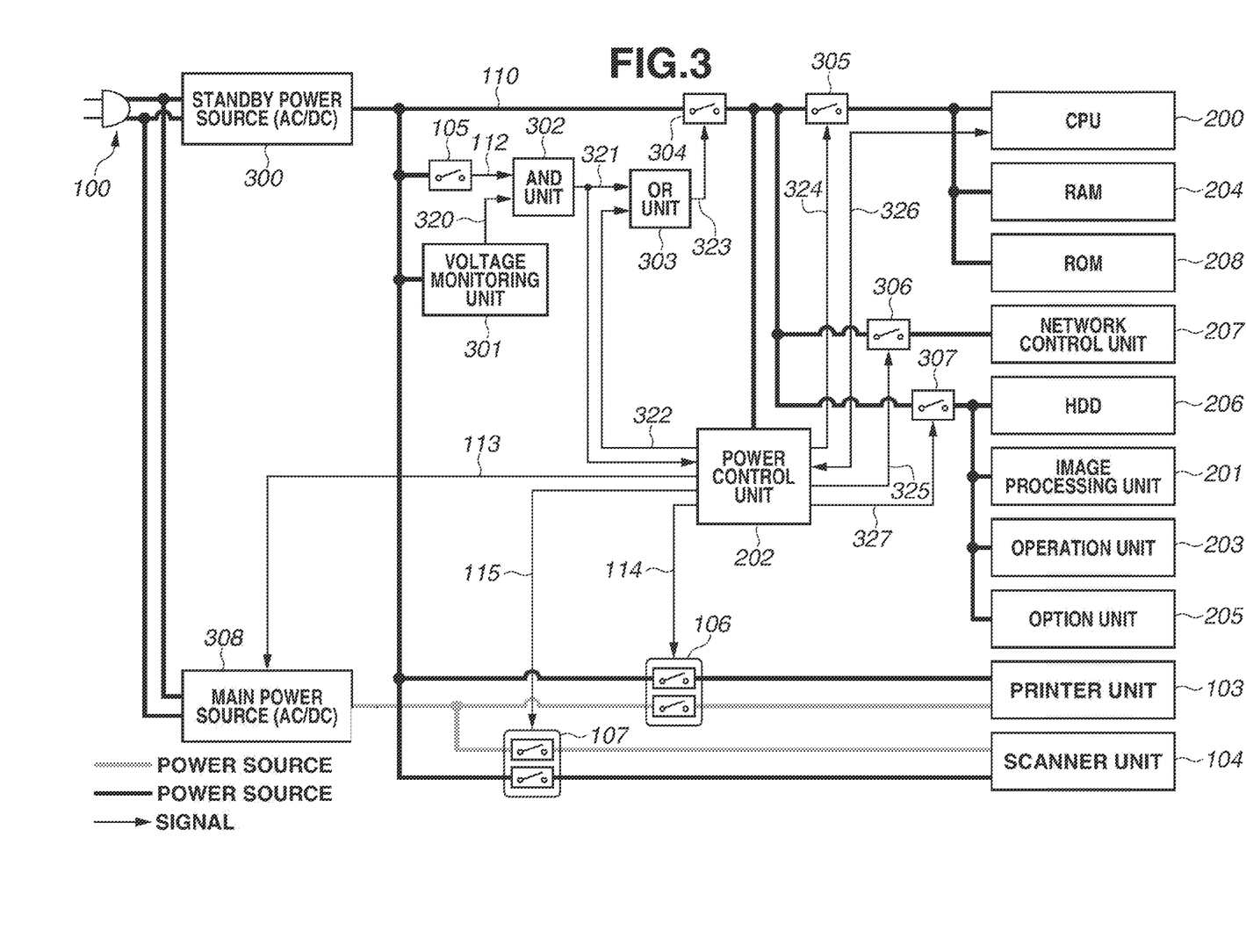
FIG. 3 is a block diagram illustrating a power source system of the image forming apparatus according to the first embodiment.

FIG. 3 is a block diagram illustrating a power source system of the image forming apparatus 1 according to the first embodiment.

As illustrated in FIG. 3, a standby power source 300 is connected to an external power source through the AC plug 100. The standby power source 300 outputs power (standby power) while the AC plug 100 is connected to the external power source. Even if the image forming apparatus 1 is in the power-OFF mode, the standby power source 300 outputs power as long as the AC plug 100 is connected to the external power source. The standby power source 300 converts an AC voltage applied from the external power source into a DC voltage (AC-DC conversion), and generates a DC voltage of 12 V. The DC voltage output from the standby power source 300 is applied to each unit (CPU 200, RAM 204, ROM 208, HDD 206, network control unit 207, image processing unit 201, operation unit 203, and option unit 205) connected to the standby power source 300. Needless to say, the DC voltage of 12 V generated by the standby power source 300 is converted by a DC-DC converter (not illustrated), into a voltage appropriate for each unit (e.g., 5 V, 3.3 V, and 1.0 V).

When the power switch 105 is turned ON by the user with the AC plug 100 being connected to the external power source, the power switch 105 outputs a switch signal (output) 112 indicating a switch-ON state (high level). When the power switch 105 is turned OFF by the user with the AC plug 100 being connected to the external power source, the power switch 105 outputs the switch signal 112 indicating a switch-OFF state (low level). The level of the switch signal 112 corresponds to a state of the power switch 105.

A voltage monitoring unit 301 monitors an output voltage from the standby power source 300. The output voltage of the standby power source 300 is applied to the voltage monitoring unit 301. The voltage monitoring unit 301, which is a typical power source monitoring integrated circuit (IC), can set delay time using an external capacitor. When the output voltage from the standby power source 300 exceeds a threshold voltage Vth and delay time Td set using the external capacitor has elapsed, the voltage monitoring unit 301 brings a voltage detection signal 320 to a high impedance state. When the output voltage is below the threshold voltage Vth, the voltage monitoring unit 301 brings the voltage detection signal 320 to the low level. The threshold voltage Vth is, for example, a voltage (e.g., 8.5 V) that is lower than a rated output voltage (12 V) of the standby power source 300 and higher than a guaranteed operation voltage (3.3 V) of the CPU 200.

An AND unit 302 outputs a logical AND output 321 of the switch signal 112 from the power switch 105 and the voltage detection signal 320 from the voltage monitoring unit 301. The logical AND 321 is output to the power control unit 202 and an OR unit 303. Turning ON the power switch 105 by the user causes the AND unit 302 to turn ON a switch 304 through the OR unit 303. Turning OFF the power switch 105 by the user causes the AND unit 302 to notify the power control unit 202 of the turning OFF of the power switch 105. The AND unit 302 may be composed of, for example, an AND gate element. When the voltage monitoring unit 301 is of an open collector output type, the AND unit 302 may be configured by connecting the output terminal of the power switch 105 with the voltage monitoring unit 301 via a resistor through pattern connection (wired AND connection).

The OR unit 303 outputs a logical OR output 323 of the logical AND output 321 from the AND unit 302 and a control signal 322 from the power control unit 202. The control signal 322 is a signal to maintain an ON state of the switch 304 when the power switch 105 is turned OFF by the user, and keep supplying power to the power control unit 202. The OR unit 303 may be configured of an OR gate element or may be configured by connecting open collector output type elements through pattern connection (wired OR connection).

The circuit composed of the AND unit 302 and the OR unit 303, to which a signal from the power switch 105 and a signal from the voltage monitoring unit 301 are input, functions as a signal output unit for outputting the logical OR output 323.

The switch 304 is a switch that is controlled by the logical OR output 323 from the OR unit 303 and that supplies power generated by the standby power source 300 to the power control unit 202 and the like. The power supplied through the switch 304 is converted by the DC-DC converter (not illustrated), into a voltage required for the power control unit 202 and supplied to the power control unit 202.

The power control unit 202 communicates with the CPU 200 through a plurality of communication signals 326 including an interrupt signal, to turn ON/OFF the switch 304, a switch 305, a switch 306, and a switch 307 in response to an instruction from the CPU 200.

The switch 305 is a switch to supply power generated by the standby power source 300 to the CPU 200, the RAM 204, and the ROM 208. The switch 305 is turned ON/OFF based on a power source control signal 324 output from the power control unit 202. The switch 306 is a switch to supply power generated by the standby power source 300 to the network control unit 207. The switch 306 is turned ON/OFF based on a power source control signal 325 output from the power control unit 202. The switch 307 is a switch to supply power generated by the standby power source 300 to the HDD 206, the image processing unit 201, the operation unit 203, and the option unit 205. The switch 307 is turned ON/OFF based on a power source control signal 327 output from the power control unit 202.

A main power source 308 is connected to the external power source through the AC plug 100. The main power source 308 converts an AC voltage received from the external power source to a DC voltage (AC-DC conversion), and generates a DC voltage of 24 V. The DC voltage output from the main power source 308 is applied to each unit (printer unit 103 and scanner unit 104) connected to the main power source 308. Needless to say, the DC voltage of 24 V generated by the main power source 308 is converted by the DC-DC converter or the like (not illustrated) to a voltage appropriate for each unit (e.g., 12 V, 5 V, and 3.3 V). The switch 106 is a switch to supply power to the printer unit 103. The switch 106 is turned ON/OFF based on a power source control signal 114 output from the power control unit 202. The switch 107 is a switch to supply power to the scanner unit 104. The switch 107 is turned ON/OFF based on a power source control signal 115 output from the power control unit 202.

In the normal power mode, each switch illustrated in FIG. 3 is turned ON. With this operation, power is supplied to each unit illustrated in FIG. 3.

In the sleep mode, the output from the main power source 308 is stopped. When the sleep mode shift condition is satisfied, the power control unit 202 controls the activation signal 113 to stop the output from the main power source 308. When the output from the main power source 308 is stopped, the supply of power to the printer unit 103 and the scanner unit 104 is stopped. When the sleep mode shift condition is satisfied, the power control unit 202 controls the power source control signal 327 to turn OFF the switch 307. With this operation, the supply of power to the HDD 206, the image processing unit 201, the operation unit 203, and the option unit 205 is stopped.

In the power-OFF mode, the supply of power to each unit illustrated in FIG. 3 is stopped. Even in the power-OFF mode, the standby power source 300 supplies power to the voltage monitoring unit 301.

<Description About Operation of Power Source Control Configuration Block>

Figure 4:
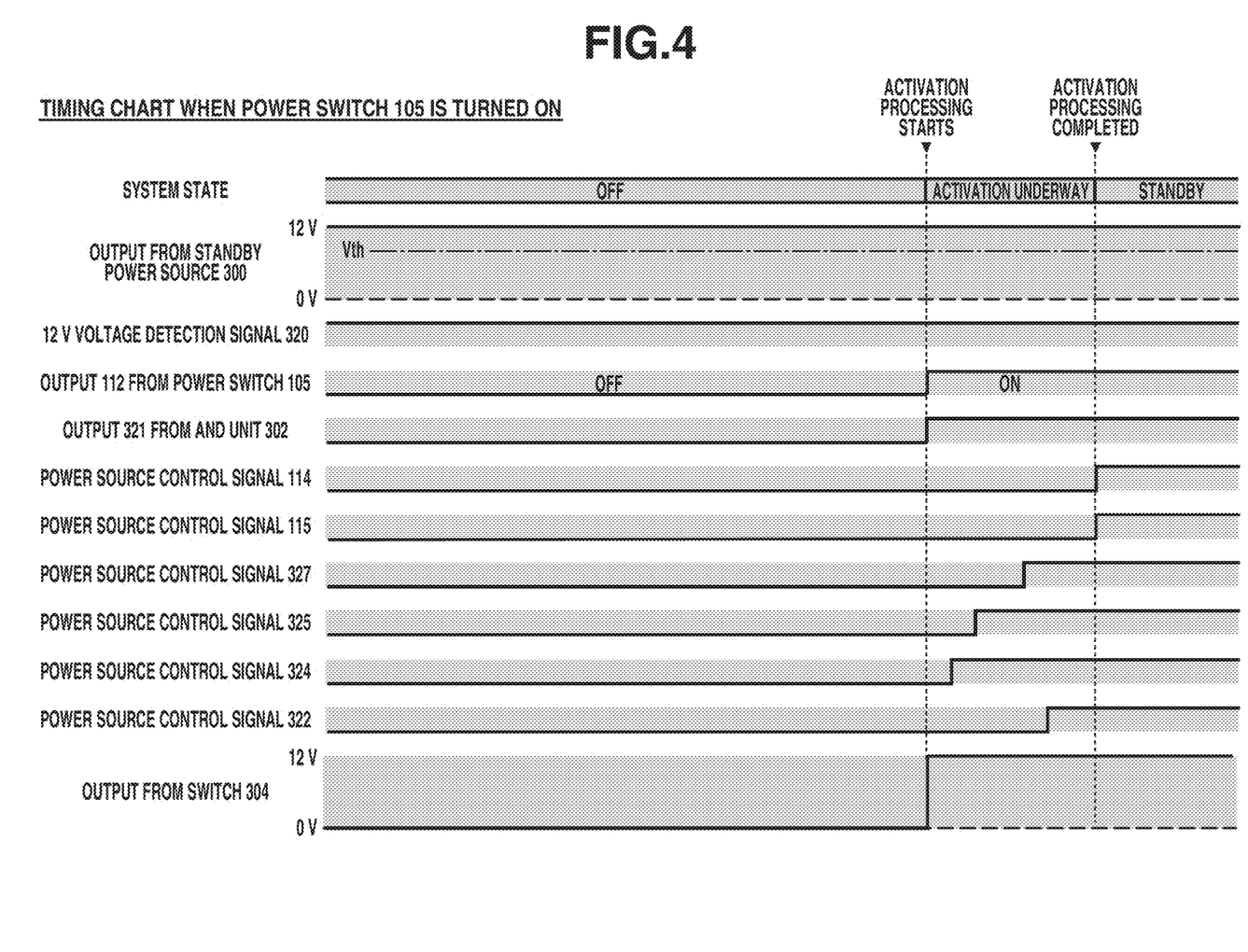
FIG. 4 is a timing chart illustrating operations performed when a power switch is turned ON according to the first embodiment.
Figure 5:
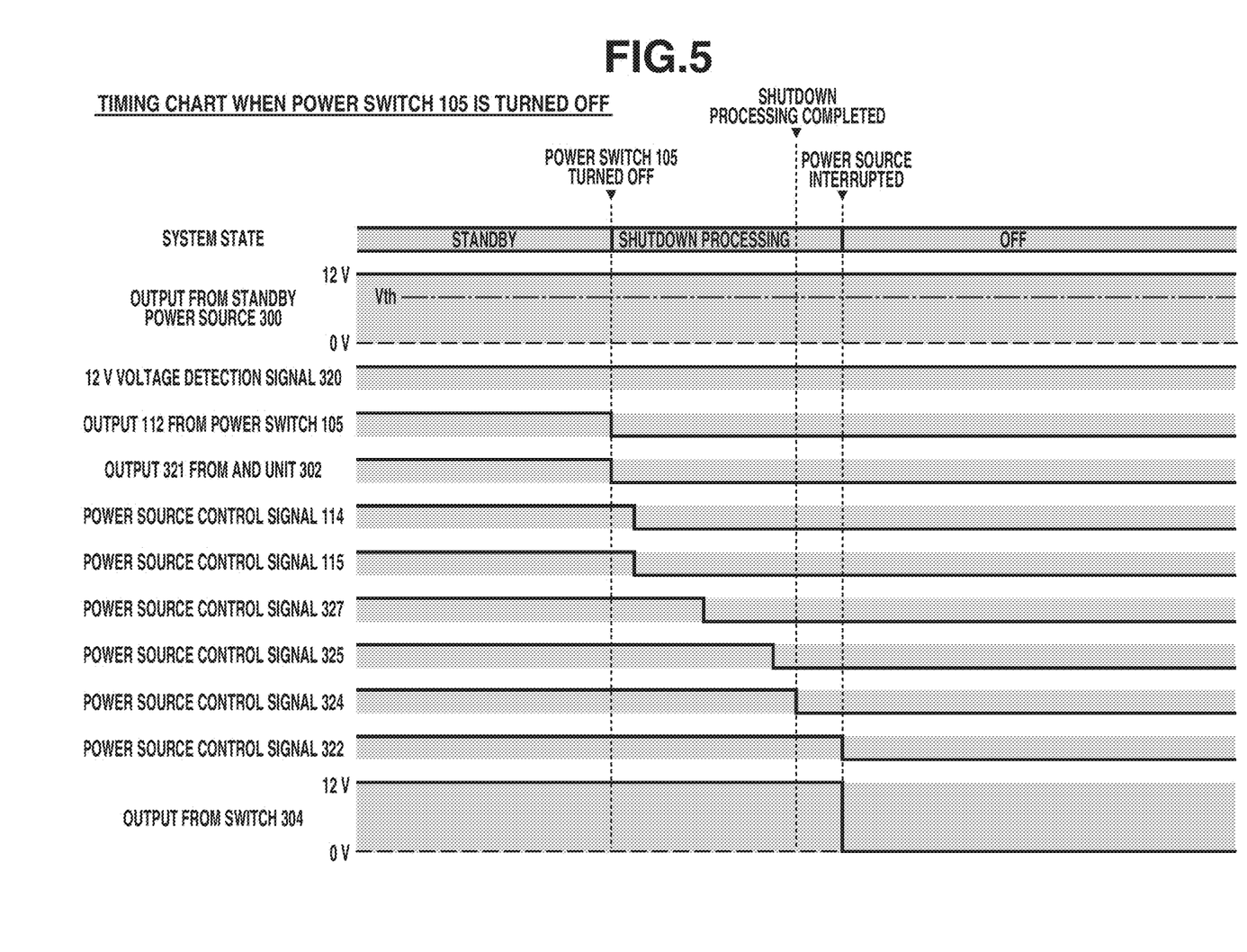
FIG. 5 is a timing chart illustrating operations performed when the power switch is turned OFF according to the first embodiment.
Figure 6:
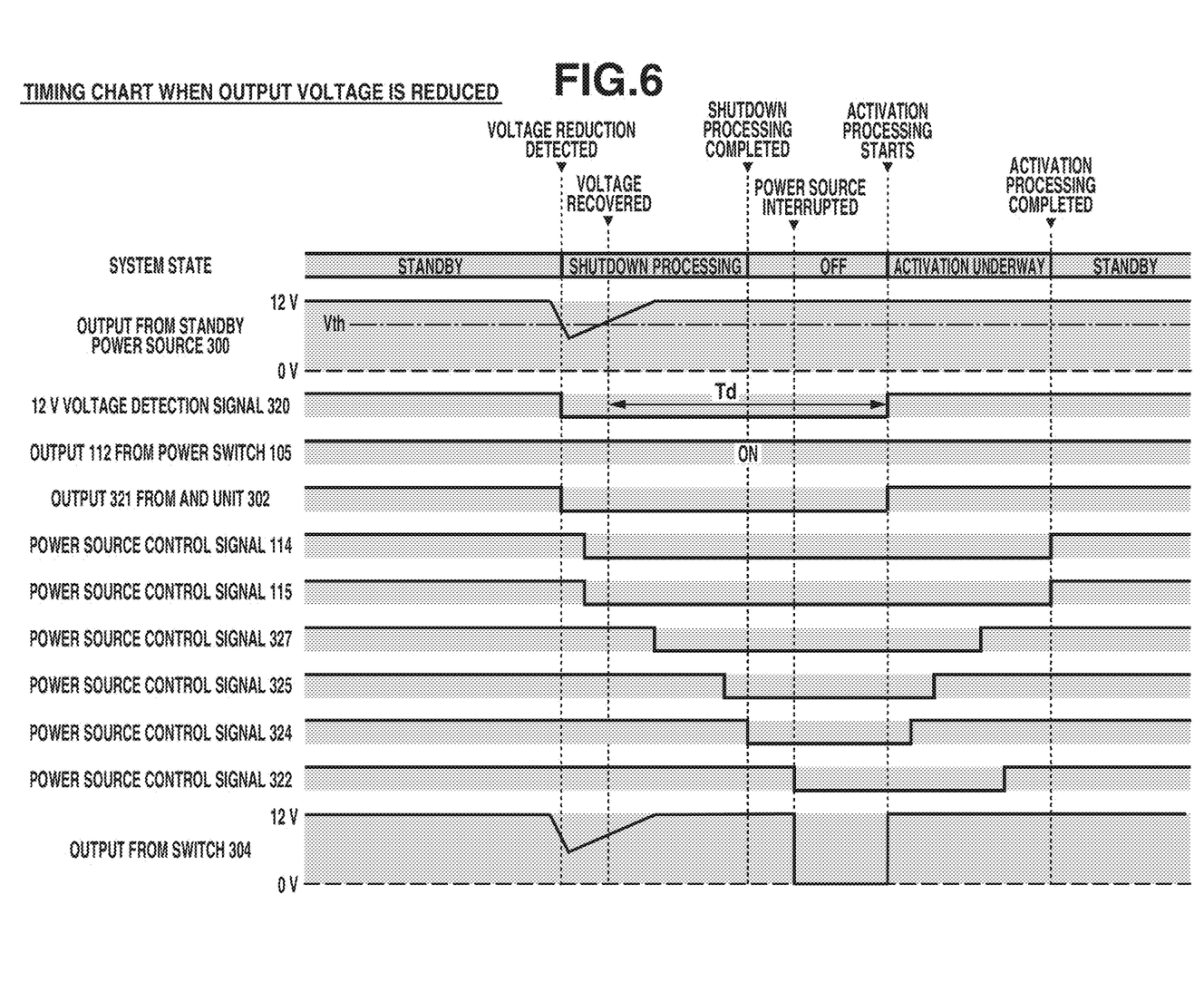
FIG. 6 is a timing chart illustrating operations performed when an output voltage from a standby power source is reduced and subsequently the output voltage is recovered.

FIGS. 4 to 6 are timing charts of the signals according to the first embodiment.

FIG. 4 is a timing chart illustrating operations performed when the power switch 105 is turned ON with the AC plug 100 being connected to the external power source.

When sufficient time has elapsed since the connection of the AC plug 100 to the external power source, an output voltage from the standby power source 300 stabilizes. When the output voltage from the standby power source 300 exceeds the threshold voltage Vth, the voltage detection signal 320 becomes high level. Turning ON the power switch 105 in a state of the voltage detection signal 320 being in the high level brings the switch signal 112 from the power switch 105 to a high level. When both the voltage detection signal 320 and the switch signal 112 become the high level, the logical AND output 321 from the AND unit 302 and the power source control signal 324 from the OR unit 303 also become the high level. This operation turns ON the switch 304, thereby supplying power output from the standby power source 300 to the power control unit 202.

When power is supplied to the power control unit 202, the power control unit 202 brings the power source control signal 324 to the high level, thereby turning ON the switch 305. With this operation, power is supplied to the CPU 200, the RAM 204, and the ROM 208. When power is supplied to the CPU 200, the RAM 204, and the ROM 208, the CPU 200 loads a program stored in the ROM 208 and starts to operate. When starting operation, the CPU 200 communicates with the power control unit 202 through the communication signal 326. The power control unit 202, based on the communication with the CPU 200, brings the power source control signal 325 to the high level and turns ON the switch 306 to supply power to the network control unit 207. When power is supplied to the network control unit 207, the CPU 200 initializes communication with the network control unit 207 to start communicating with the network control unit 207. Subsequently, the CPU 200 brings the power source control signal 327 to the high level, thereby turning ON the switch 307. With this operation, power is supplied to the HDD 206, the image processing unit 201, the operation unit 203, and the option unit 205.

Further, the power control unit 202 brings the power source control signals 114 and 115 to the high level based on the communication with the CPU 200. When the power source control signal 114 and 115 are brought to the high level, the switches 106 and 107 are turned ON. With this operation, power is supplied to the printer unit 103 and the scanner unit 104. When supplied with power, the printer unit 103, for example, drives a motor for a fixing unit, drives a motor for a polygon mirror, and warms up the fixing unit. When supplied with power, the scanner unit 104, for example, turns ON light emitting diodes (LEDs) of a contact image sensor (CIS), and determines a home position of a scanning head. When these operations are completed, the image forming apparatus 1 shifts to the standby state.

Until the image forming apparatus 1 shifts to the standby state, the CPU 200 brings the control signal 322 to the high level through the power control unit 202.

FIG. 5 is a timing chart illustrating signals output when the power switch 105 is turned OFF.

Turning OFF the power switch 105 with the image forming apparatus 1 being in the standby state brings the switch signal 112 from the power switch 105 to the low level. Thus, the logical AND output 321 from the AND unit 302 is also brought to the low level. Even if the logical AND output 321 from the AND unit 302 becomes low level, the control signal 322 remains at the high level, so that the logical OR output 323 from the OR unit 303 remains at the high level and the switch 304 remains ON.

When the output 321 from the AND unit 302 becomes low level, the power control unit 202 communicates with the CPU 200 through the communication signal 326. When notified of the turning-OFF of the power switch 105, the CPU 200 executes shutdown processing. The shutdown processing includes termination processing of software executed by the CPU 200 (application software and operating system) and closing processing of a file. The shutdown processing further includes store processing of contents of the RAM 204 to the HDD 206, cache flush of the HDD, retraction of the HDD head, and processing to store setting values regarding image processing stored in the image processing unit 201 to the nonvolatile area. The operation unit 203 displays that the shutdown processing is being performed. The shutdown processing includes termination processing of the communication by the option unit.

When the CPU 200 starts the shutdown processing, the printer unit 103, for example, releases pressing by the fixing unit and separates a primary transfer unit based on an instruction from the CPU 200. Further, the scanner unit 104, for example, moves the scanner head to the home position. When the shutdown processing is completed, the power control unit 202 brings the power source control signals 114 and 115 to the low level based on an instruction from the CPU 200. With this operation, the switches 106 and 107 are turned OFF, thereby stopping the supply of power to the printer unit 103 and the scanner unit 104. Further, the power control unit 202 brings the power source control signal 327 to the low level, thereby stopping the supply of power to the HDD 206, the image processing unit 201, the operation unit 203, and the option unit 205.

Further, the CPU 200 resets the network control unit 207 so that the supply of power to the network control unit 207 can be interrupted. The power control unit 202 brings the power source control signal 325 to the low level to stop the supply of power to the network control unit 207.

When various processing executed by the CPU 200 is completed, the power control unit 202 brings the power source control signal 324 to the low level, thereby stopping the supply of power to the CPU 200, the RAM 204, and the ROM 208. Further, the power control unit 202 checks a level of the logical AND output 321 from the AND unit 302. When it is the low level, the power control unit 202 brings the control signal 322 to the low level. With this operation, the switch 304 is turned OFF. Consequently, the supply of power to the power control unit 202 is stopped and the image forming apparatus 1 shifts to the power-OFF mode.

FIG. 6 is a timing chart illustrating operations performed when the output voltage from the standby power source 300 is reduced and subsequently the output voltage is recovered.

When an output voltage 110 from the standby power source 300 is reduced to be lower than the threshold voltage Vth when the image forming apparatus 1 is in the standby state, the voltage monitoring unit 301 brings the voltage detection signal 320 to the low level. When the voltage detection signal 320 becomes low level, the logical AND output 321 from the AND unit 302 becomes low level. When the logical AND output 321 from the AND unit 302 becomes low level, the power control unit 202 communicates with the CPU 200 through the communication signal 326. When notified of the turning-OFF of the power switch 105, the CPU 200 executes shutdown processing. The shutdown processing to be executed at this time is the same as the shutdown processing executed when the power switch 105 is turned OFF, but is not necessarily identical completely.

Subsequently, when the output voltage 110 from the standby power source 300 is recovered and exceeds the threshold voltage Vth, the voltage monitoring unit 301 maintains the low level of the logical AND output 321 until the delay time TD that is set using the external capacitor elapses. A threshold voltage used to determine whether the output voltage 110 is recovered may be different from the threshold voltage Vth used to determine whether the output voltage stabilizes.

When the shutdown processing is completed, the power control unit 202 checks the level of the logical AND output 321 from the AND unit 302. If it is determined to be the low level, the power control unit 202 causes the control signal 322 to be low level. With this operation, the switch 304 is turned OFF. Consequently, the supply of power to the power control unit 202 is stopped and the image forming apparatus 1 shifts to the power-OFF mode.

When the delay time Td set to the voltage monitoring unit 301 has elapsed, the voltage detection signal 320 becomes high level. Subsequently, in the same activation sequence as that when the power switch 105 is turned ON described with reference to FIG. 4, the supply of power to each unit of the image forming apparatus 1 is resumed, and the image forming apparatus 1 shifts to the standby state.

Advantageous Effect of First Embodiment

According to the first embodiment, even if the output voltage from the standby power source 300 is reduced, the shutdown processing of the image forming apparatus 1 can be executed. In this way, software can be appropriately terminated. Further, the contents in the RAM 204 can be stored in the HDD 206 and the cache flush of the HDD can be executed, so that a loss of data can be prevented. Furthermore, setting values regarding image processing can be stored in a nonvolatile area, so that a loss of the setting values can be prevented. In addition, the head of the HDD can be retracted, so that the head can be prevented from affecting a disk.

Furthermore, according to the first embodiment, when the output voltage from the standby power source 300 is recovered, the image forming apparatus 1 can be activated without operating the power switch by the user. This operation can prevent the image forming apparatus 1 from remaining in the power-OFF mode for a while despite the recovery of the power source. With this operation, for example, the facsimile machine can be prevented from remaining in a state of being unable to receive facsimile data.

<Description About Power Source Control Configuration Block>

Figure 7:
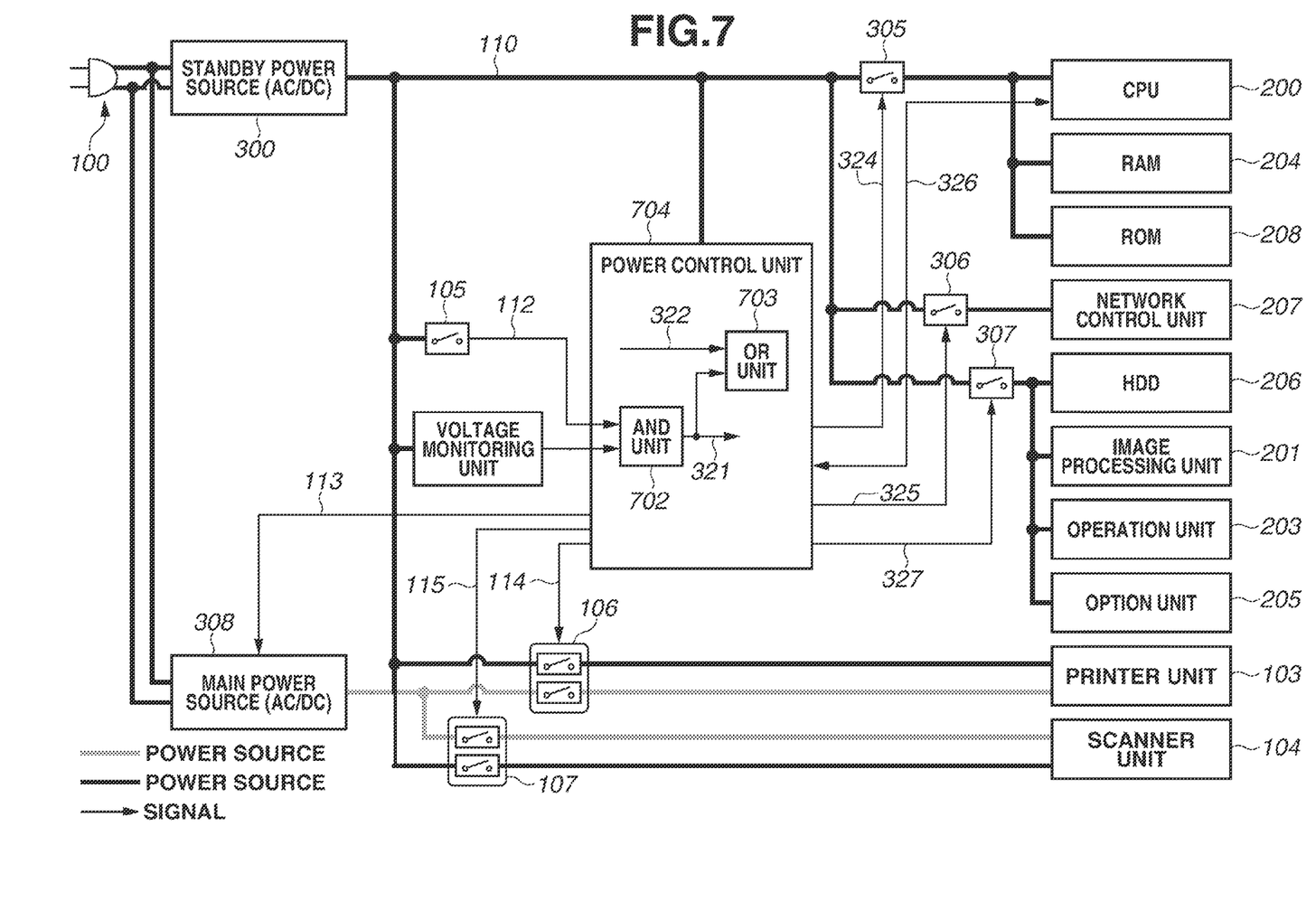
FIG. 7 is a block diagram illustrating a power source system of an image forming apparatus according to a second embodiment.

FIG. 7 is a block diagram illustrating a power source system of an image forming apparatus according to a second embodiment.

According to the second embodiment, an AND unit 702 corresponding to the AND unit 302 of the first embodiment and an OR unit 703 corresponding to the OR unit 303 of the first embodiment are incorporated in a power control unit 704. Incorporating the AND unit 702 and the OR unit 703 in the power control unit 704 can reduce the number of parts.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2019-077389, filed Apr. 15, 2019, which is hereby incorporated by reference herein in its entirety.

What is claimed is:

1. An electronic apparatus, comprising:
a power switch;
a power source;
a power monitoring circuit configured to monitor an output voltage from the power source;
a power controller configured to control power supply from the power source;
a circuit configured to output a signal to the power controller on conditions that the circuit receives inputs from both the power switch and the power monitoring circuit; and
a processor that operates using power output from the power source, the processor being configured to:
execute activating processing and shutdown processing to the electronic apparatus based on the signal output from the circuit having received an input from the power switch;
execute the activating processing and the shutdown processing to the electronic apparatus based on the signal output from the circuit having received an input from the power monitoring circuit;
execute the shutdown processing to the electronic apparatus based on the monitored voltage falling below a first threshold even if the power switch is kept to be ON, and
based on the monitored voltage rising above a second threshold while the power switch is kept to be ON from when the shutdown processing is executed, execute the activation processing to the electronic apparatus.

2. The electronic apparatus according to claim 1, wherein the first threshold is equal to the second threshold.

3. The electronic apparatus according to claim 1, wherein the power source includes an alternating current (AC) to direct current (DC) converter.

4. The electronic apparatus according to claim 1, wherein the power source is a standby power source configured to output standby power.

5. An electronic apparatus, comprising:
a power switch;
a power source;
a power monitoring circuit configured to monitor an output voltage from the power source;
a power controller configured to control power supply from the power source;
a circuit configured to output a signal to the power controller on conditions that the circuit receives inputs from both the power switch and the power monitoring circuit; and
a processor that operates using power output from the power source, the processor being configured to:
execute activating processing and shutdown processing to the electronic apparatus based on the signal output from the circuit having received an input from the power switch;
execute the activating processing and the shutdown processing to the electronic apparatus based on the signal output from the circuit having received an input from the power monitoring circuit;
execute the shutdown processing to the electronic apparatus based on the monitored voltage falling below a first threshold even if the power switch is kept to be ON, and
based on the monitored voltage rising above a second threshold while the power switch is kept to be ON from when the shutdown processing is executed, execute the activation processing to the electronic apparatus.

6. The electronic apparatus according to claim 1, wherein the processor is configured to execute the activation processing to the electronic apparatus based on a predetermined time having elapsed since the monitored voltage has risen above the threshold.

7. The electronic apparatus according to claim 6, wherein the predetermined time is set to be longer than a duration for completing the shutdown processing.

8. The electronic apparatus according to claim 1, further comprising a storage,
wherein the storage is a hard disk or a solid state disk (SSD).

9. The electronic apparatus according to claim 1, wherein the power source does not stop outputting power while a DC voltage is supplied to the power source through a plug.

10. The electronic apparatus according to claim 1, further comprising a printer configured to print an image on a recording medium.

11. The electronic apparatus according to claim 1, further comprising a reader configured to read an original document image.

12. The electronic apparatus according to claim 1, wherein the processor is configured to:
execute the activation processing to the electronic apparatus if the monitored voltage rises above the second threshold in the electronic apparatus to which the shutdown processing, based on the monitored voltage falling below the first threshold, has been executed, and
not execute the activation processing to the electronic apparatus if the monitored voltage rises above the second threshold in the electronic apparatus to which the shutdown processing has been executed, the shutdown processing executed based on a user operation for turning off the electronic apparatus.

13. The electronic apparatus according to claim 1, wherein the processor is configured to:
based on the monitored voltage rising above the second threshold, execute the activation processing to the electronic apparatus that the shutdown processing, based on the monitored voltage having fallen below the first threshold, has been executed, and
even if the monitored voltage rises above the second threshold, not execute the activation processing to the electronic apparatus to which the shutdown processing has been executed, the shutdown processing executed based on a user operation for turning off the electronic apparatus.

14. The electronic apparatus according to claim 1, wherein the shutdown processing includes movement of data from a volatile storage device to a non-volatile storage device.

15. A shutdown method of an electronic apparatus, wherein the electronic apparatus includes a power switch, a power source and a power monitoring circuit, the power source supplying power to a processor, the power monitoring circuit configured to monitor an output voltage from the power source, a power controller configured to control power supply from the power source, a circuit configured to output a signal to the power controller on conditions that the circuit receives inputs from both the power switch and the power monitoring circuit the shutdown method comprising:
executing activating processing and shutdown processing to the electronic apparatus based on and shutdown processing to the electronic apparatus based on the signal output from the circuit having received an input from the power switch;
executing the activating processing and the shutdown processing to the electronic apparatus based on the signal output from the circuit having received an input from the power monitoring circuit;
executing the shutdown processing to the electronic apparatus based on the monitored voltage falling below a first threshold even if the power switch is kept to be ON, and
based on the monitored voltage rising above a second threshold while the power switch is kept to be ON from when the shutdown processing is executed, executing the activation processing to the electronic apparatus.

16. The shutdown method according to claim 15, wherein the first threshold is equal to the second threshold.

17. The shutdown method according to claim 15, wherein the power source does not stop outputting power while a DC voltage is supplied to the power source through a plug.

18. The shutdown method according to claim 15, wherein the electronic apparatus includes a printer configured to print an image on a recording medium or a reader configured to read an original document image.

* * * * *